United States Patent
Hundt et al.

(10) Patent No.: US 9,516,092 B2
(45) Date of Patent: Dec. 6, 2016

(54) PRECOMPILING LOCALLY-STORED INSTRUCTIONS FOR A WEB APPLICATION

(71) Applicant: Google Inc., Mountain View, CA (US)

(72) Inventors: Robert Hundt, Piedmont, CA (US); Mark Heffernan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 345 days.

(21) Appl. No.: 13/907,592

(22) Filed: May 31, 2013

(65) Prior Publication Data

US 2015/0215375 A1    Jul. 30, 2015

Related U.S. Application Data

(60) Provisional application No. 61/780,690, filed on Mar. 13, 2013.

(51) Int. Cl.
| | | |
|---|---|---|
| H04L 29/08 | (2006.01) | |
| G06F 17/30 | (2006.01) | |
| H04L 12/24 | (2006.01) | |
| G06F 9/445 | (2006.01) | |

(52) U.S. Cl.
CPC ....... *H04L 67/025* (2013.01); *G06F 17/30902* (2013.01); *H04L 67/02* (2013.01); *H04L 67/1095* (2013.01); *G06F 8/66* (2013.01); *H04L 41/0843* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,182,122 B1* | 1/2001 | Berstis | ............. | G06F 17/30902 707/E17.12 |
| 2009/0292791 A1* | 11/2009 | Livshits | ............... | G06F 9/4443 709/217 |
| 2011/0145803 A1* | 6/2011 | Soderstedt | ............... | G06F 8/66 717/154 |
| 2011/0283267 A1* | 11/2011 | Waite | .................. | G06F 11/3672 717/135 |
| 2013/0226992 A1* | 8/2013 | Bapst | ............... | G06F 17/30902 709/203 |

(Continued)

OTHER PUBLICATIONS

VLADAN, "Implementation," Feb. 1, 2013, <https://developer.mozilla.org/en-US/docs/DOM/Storage/Implementation>, 6 pages.

*Primary Examiner* — Ranodhi Serrao
*Assistant Examiner* — James Fiorillo
(74) *Attorney, Agent, or Firm* — McDermott Will & Emery LLP

(57) ABSTRACT

Systems and methods for accessing locally-stored content for a web application are disclosed. In some aspects, a user input for requesting a web application is received at a client computing device. A network request for the web application is provided via a network. That software code for the web application is stored in local storage of the client computing device is determined. The stored software code for the web application is placed into a random access memory (RAM) of the client computing device. At least a portion of the stored software code is precompiled prior to receiving a response to the network request.

17 Claims, 6 Drawing Sheets

(56) References Cited

U.S. PATENT DOCUMENTS

| 2013/0227354 A1* | 8/2013 | Shah | G06F 11/362 |
| | | | 714/48 |
| 2014/0012949 A1* | 1/2014 | Meyers | H04L 67/1095 |
| | | | 709/217 |
| 2014/0019597 A1* | 1/2014 | Nath | H04L 41/0843 |
| | | | 709/220 |

* cited by examiner

US 9,516,092 B2

PRECOMPILING LOCALLY-STORED INSTRUCTIONS FOR A WEB APPLICATION

CROSS REFERENCE TO RELATED APPLICATIONS

This application claims priority under 35 U.S.C. §119(e) and the benefit of U.S. Provisional Application No. 61/780,690, filed Mar. 13, 2013, and entitled, "ACCESSING LOCALLY-STORED DATA OR INSTRUCTIONS FOR A WEB APPLICATION," the entire disclosure of which are incorporated herein by reference.

BACKGROUND

The subject technology generally relates to web interfaces and, in particular, relates to pre-compiling locally-stored instructions for a web application, where the locally-stored instructions reside at a client computing device.

Web applications (e.g., electronic messaging applications, social networking applications, newspaper applications, etc.) are typically provided via web pages that are accessible via a web browser or another application executing on a client computing device. However, delivering large web applications to client computing device(s) may take much network download time or network resources.

SUMMARY

In some aspects, the disclosed subject matter relates to a computer-implemented method for accessing locally stored content for a web application. The method includes receiving, at a client computing device, a user input for requesting a web application. The method includes providing, via a network, a network request for the web application. The method includes determining that software code for the web application is stored in local storage of the client computing device. The method includes placing the stored software code for the web application into a random access memory (RAM) of the client computing device. The method includes precompiling at least a portion of the stored software code prior to receiving a response to the network request.

In some aspects, the disclosed subject matter relates to a non-transitory computer-readable medium encoded with executable instructions for accessing locally stored content for a web application. The instructions include code for receiving, at the computer, a user input for requesting a web application. The instructions include code for determining that software code for the web application is stored in local storage of the computer. The instructions include code for placing the stored software code for the web application into a random access memory (RAM) of the computer. The instructions include code for precompiling at least a portion of the stored software code.

In some aspects, the disclosed subject matter relates to a system for accessing locally stored content for a web application. The system includes one or more processors and local storage. The local storage resides on a random access memory (RAM) and a disk. The local storage includes software code for a web application stored on the disk, and a client application software code area storing instructions. The instructions include code for receiving a user input for requesting a web application. The instructions include code for providing, via a network, a network request for the web application. The instructions include code for placing the stored software code for the web application from the disk into the random access memory (RAM). The instructions include code for precompiling at least a portion of the stored software code prior to receiving a response to the network request.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
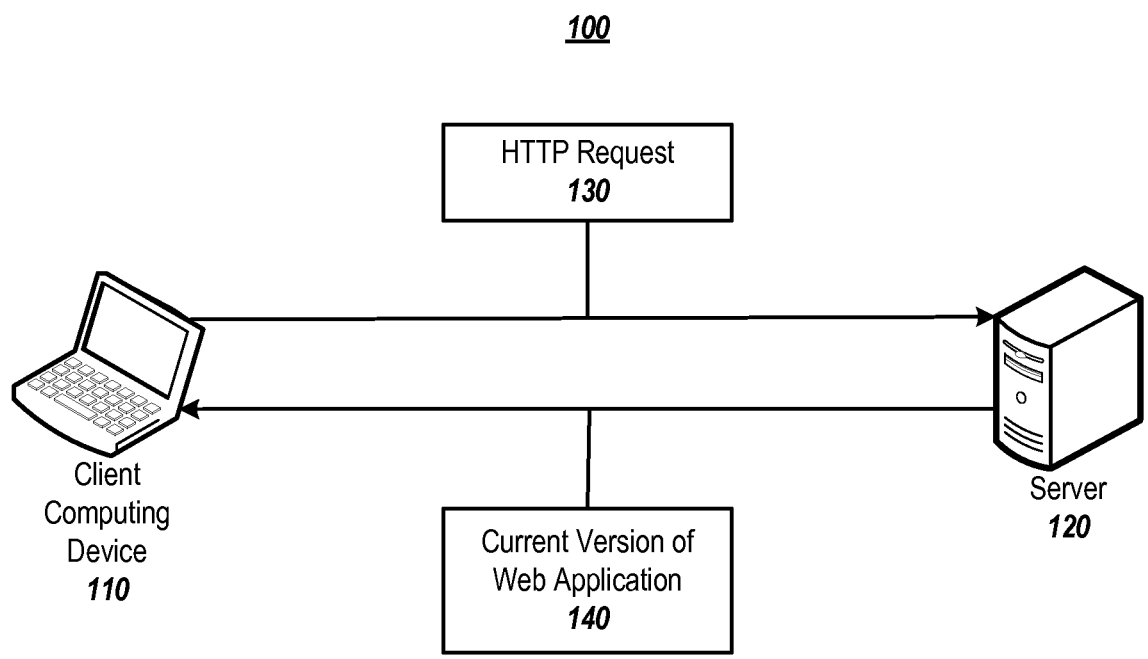
FIG. 1 illustrates an example of a system for pre-compiling locally-stored instructions for a web application.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As set forth above, web applications (e.g., electronic messaging applications, social networking applications, newspaper applications, etc.) are typically provided via web pages that are accessible via a web browser or another application executing on a client computing device. However, delivering large web applications to client computing device(s) may take much network download time or network resources, as large web applications may include large amounts of code or data that need to be downloaded at a client computing device. As the foregoing illustrates, a new approach for accessing data or instructions for a web application may be desirable.

Some approaches include transmitting from the server to the client computing device, a small initial loading file for the web application, followed by a larger file, or a delta file to update a prior version of the web application stored at the client computing device. However, these approaches may also require time to execute, as they require accessing and modifying data stored on a disk of the client computing device, which is typically a serial (rather than parallel) process.

In some implementations, a client computing device may locally store data or instructions for a web application that the client computing device previously accessed. As a result, the client computing device may obtain, via the network, a delta file indicating the differences between the version of the web application on the client computing device and the version of the web application on the network, rather than the full web application. Typically, the locally stored data or instructions for the web application reside on a disk of the client computing device. Copying the data or instructions from the disk to the random access memory (RAM) may take much processing time. In some cases (e.g., when the client computing device is connected to a fast network), copying the data or instructions from the disk to the RAM may be slower than accessing the data or instructions via the network, as accessing data on a disk may be a serial, rather than a parallel, process.

The subject technology provides techniques for accessing locally-stored data or instructions for a web application and precompiling locally-stored instructions for a web application.

According to some implementations, a client computing device receives a user input requesting a web application. For example, the user could type "www.example.com" into a uniform resource locator (URL) input box of a browser or select a link to the www.example.com webpage. Alternatively, the user could start typing "www.exa," and the client computing device could recognize (e.g., via auto-complete functionality) that the user is likely trying to access the www.example.com web application.

The client computing device provides, via a network, a network request for the web application. Before receiving the response to the network request for the web application, the client computing device determines that content for the web application is stored locally at the client computing device, for example, on a disk of the client computing device. The client computing device may store content for the web application if the client computing device has previously accessed the web application. (In some cases, the client computing device can complete the determination after receiving the response to the network request. In such cases, the client computing device processes the response to execute the web application, and does not need to rely on the previously locally stored content for the web application.) The client computing device places the content for the web application that is stored locally at the client computing device into a RAM of the client computing device, to "pre-heat" the RAM of the client computing device to be able to process the web application when the response to the network request for the web application arrives. In some cases, the response to the network request includes a delta file for updating the content for the web application that is stored locally at the client computing device to the current version of the content for the web application stored on the network. Alternatively, the response to the network request indicates that the content of the web application that is stored locally at the client computing device is equivalent to the content of the web application stored on the network.

Depending on an amount of aggressiveness or performance optimization desired and depending on a probability that the content of the web application will be updated, the client computing device can take additional steps with the locally-stored content of the web application. The probability that the content of the web application will be updated can be determined based on an amount of time since the web application was last accessed and a frequency of updates of the web application based on the past experience of the client computing device with the web application. The aggressiveness or performance optimization that is desired may be user-specified or determined based on settings of an application (e.g., a browser) or the client computing device.

In some cases, the content for the web application that is stored locally at the client computing device includes software code. The client computing device loads the stored software code while waiting for the response to the network request for the web application.

In some implementations, the client computing device parses or precompiles the stored software code while waiting for the response to the network request for the web application. Upon receiving the response to the network request for the web application, the client computing device determines whether the stored software code is equivalent to software code received in the response to the network request. If the stored software code is equivalent to the software code received in response to the network request, the client computing device executes the precompiled stored software code. If the stored software code is not equivalent to the software code received in response to the network request, the client computing device compiles and executes the software code received in the response to the network request, while foregoing execution of the precompiled stored software code.

FIG. 1 illustrates an example of a system 100 for precompiling locally-stored instructions for a web application.

As shown, the system 100 includes a client computing device 110 and a server 120 communicating via a network, for example, the Internet, a cellular network, a local area network, a wide area network, a virtual private network, etc. The client computing device 110 may be a mobile phone, a personal digital assistant (PDA), a personal digital music player, a tablet computer, a laptop computer, a desktop computer, a television with one or more processors embedded therein or coupled thereto, etc. The server 120 can include a single server or a server farm with multiple servers. While only a single client computing device 110 and server 120 are illustrated, the subject technology may be implemented with multiple client computing devices or multiple servers.

As illustrated in FIG. 1, the client computing device 110 transmits a hypertext transfer protocol (HTTP) request 130 to the server 120. The HTTP request 130 can include a request for a web page that includes a web application, for example, an electronic messaging application, a calendar application, a video application, or a social networking application. The HTTP request 130 can include a uniform resource locator (URL) for the requested web page or the requested web application.

In response to the HTTP request 130, the server 120 provides a current version of the web application 140 to the client computing device. However, if the client computing device 110 or the server 120 has a slow network connection, the current version of the web application 140 may take a significant amount of time to reach the client computing device 110 and be presented at the client computing device 110. In some aspects, as explained in greater detail below, information stored at the client computing device 110 is used to expedite the presentation of the web application at the client computing device.

Figure 2:
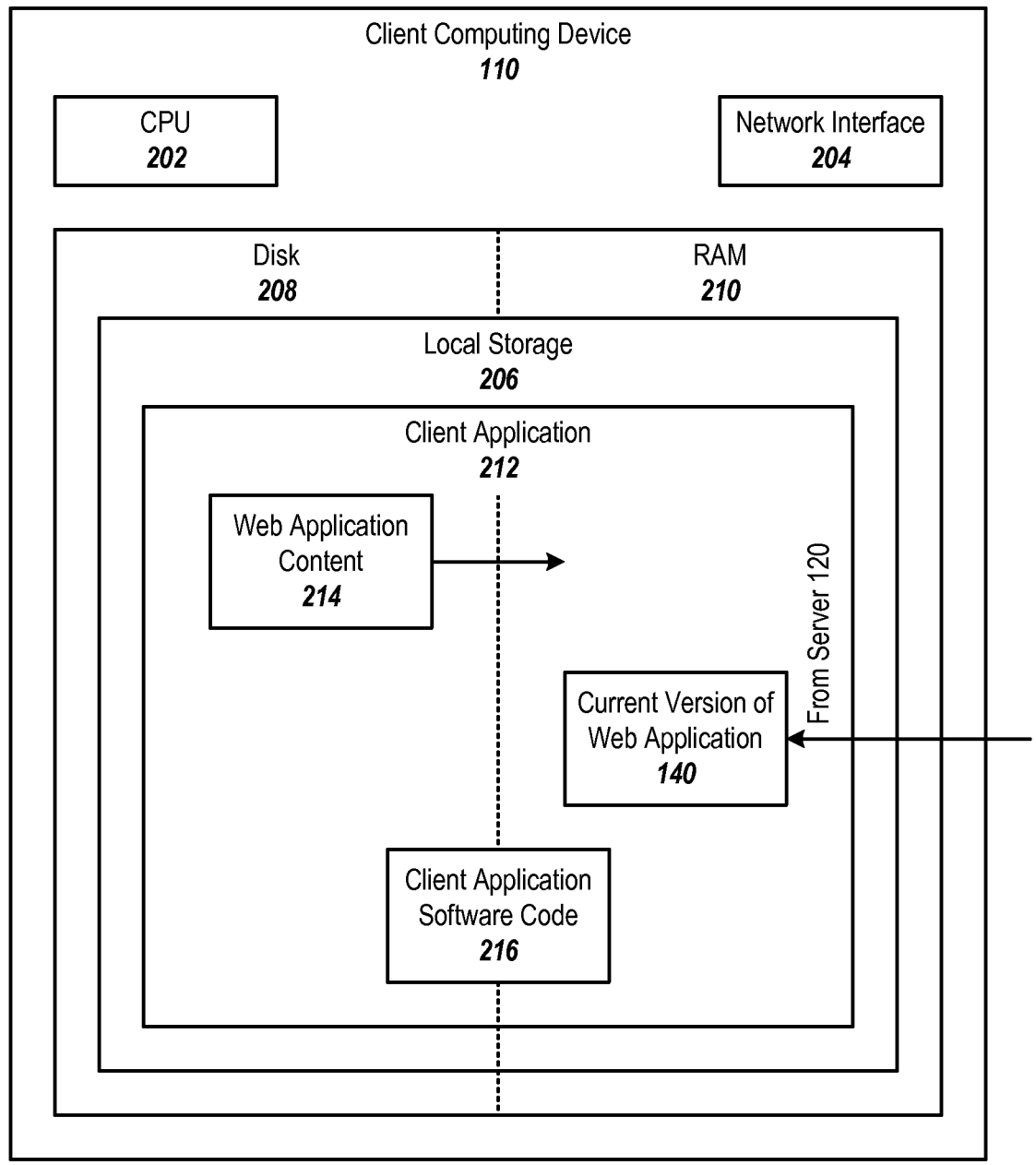
FIG. 2 illustrates an example of the client computing device of FIG. 1.

FIG. 2 illustrates an example of the client computing device 110 of FIG. 1.

As shown, the client computing device 110 includes a central processing unit (CPU) 202, a network interface 204, a disk 208, and a random access memory (RAM) 210. The CPU 202 may include one or more processors. The CPU 202 is configured to execute computer instructions that are stored in a computer-readable medium, for example, the disk 208 or the RAM 210. The network interface 204 is configured to allow the client computing device 110 to transmit and receive data in a network, e.g., to communicate with the server 120. The network interface 204 may include one or more network interface cards (NICs). The disk 208 and the RAM 210 store data and/or instructions. The disk 208 is separate and distinct from the RAM 210. As shown, the disk 208 and the RAM 210 include local storage 206.

As shown, the local storage 206 stores a client application 212, with parts of the client application residing in the disk 208 and parts of the client application residing in the RAM 210. The client application 212 can be any application for executing web application(s), e.g., viewing web page(s) executing code associated with the viewed webpage(s). For example, the client application 208 can be a web browser or a mobile phone or tablet computer application for viewing certain Internet-based content (e.g., a mobile phone social networking application). If the client application 212 is a web browser, the RAM 210 can include a web browser cache or a web browser cache can carry out the functions of the RAM 210 described herein.

As shown, the client application 212 includes client application software code 216, web application content 214, and the current version of the web application 140, each of which is stored in portions of the disk 208 or the RAM 210 associated with the client application 212.

The client application software code 216 includes code for accessing and presenting web applications based on data accessed via the network (e.g., via the server 120) or data stored in the local storage 206 of the client computing device. For example, the client application software code 216 may include code for receiving a URL and presenting a web application corresponding to the URL. All or a portion of the client application software code 216 can be stored on the disk 208. All or a portion of the client application software code 216 can be stored on the RAM 210. As shown, the client application software code 216 is partially stored on the disk 208 and partially stored on the RAM 210. In some examples, the client application software code 216 is stored on the RAM 210 and copied to the disk 208 at execution time when the client application 212 is being executed on the client computing device 110.

The web application content 214 includes content (e.g., text, image(s), software code, etc.) from a web application that was previously accessed by the client application 212 executing on the client computing device 110. The web application content may include stored software code. The stored software code can be written in any programming language. The programming language can be a scripting language, for example, JavaScript.

As shown, the web application content 214 is stored on the disk 208. However, upon receiving, from a user of the client computing device 110, a request to access the web application, the client application 212 can move the web application content 214 to the RAM for pre-processing while waiting to receive the current version of the web application 140 from the server 120 via the network. The pre-processing of the web application content 214 can include loading stored software code in the web application content 214, parsing the stored software code, or precompiling at least a portion of the stored software code.

The current version of the web application 140 includes content for the web application received from the server 120. Upon receipt from the server 120, the current version of the web application 140 is stored in the RAM 210.

According to some aspects, the client application software code 216 includes code for receiving a user input for requesting a web application. The client application software code 216 includes code for providing, via the network, a network request (e.g., HTTP request 130) for the web application. The client application software code 216 includes code for accessing the web application content 214 from the disk 208. The client application software code 216 includes code for placing the accessed web application content 214 into the RAM 210. The client application software code 216 can be written in any programming language, for example, C or C++.

In some examples, the subject technology may be implemented with a software stack that is organized hierarchically. A bottom level of the stack can include hardware (e.g., as described below in conjunction with FIG. 4). A next level of the stack can include an operating system that includes a file system. A level following the operating system can include a client application (e.g., client application 212, which may be a web browser). The client application can include a JavaScript engine and an ability to access the file system (e.g., local storage). A level following the client application level can include web application(s) that access the client application's local storage system, for example, via JavaScript.

Figure 3A:
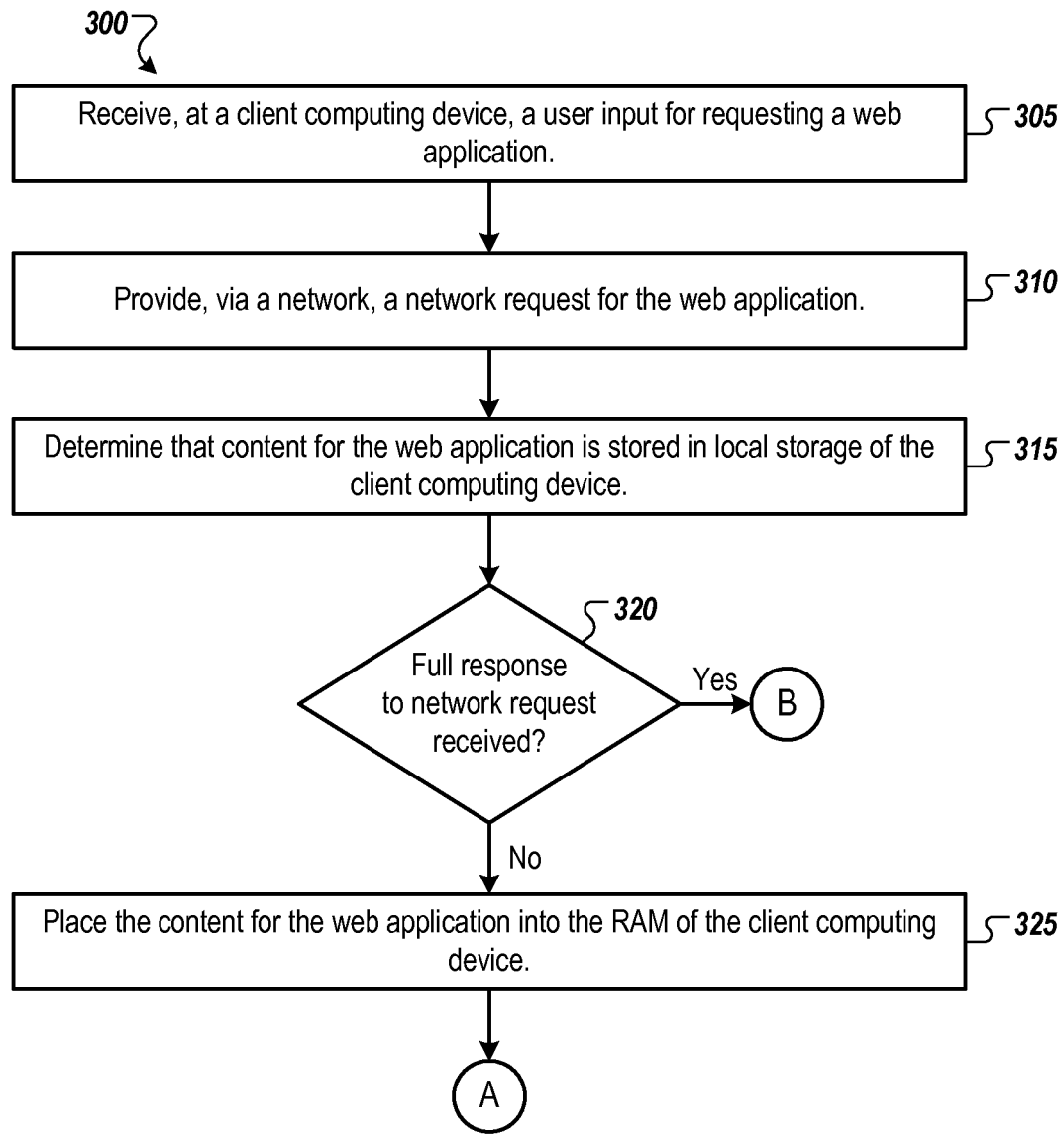
FIGS. 3A-3C illustrates an example process by which locally-stored instructions for a web application may be precompiled.
Figure 3B:
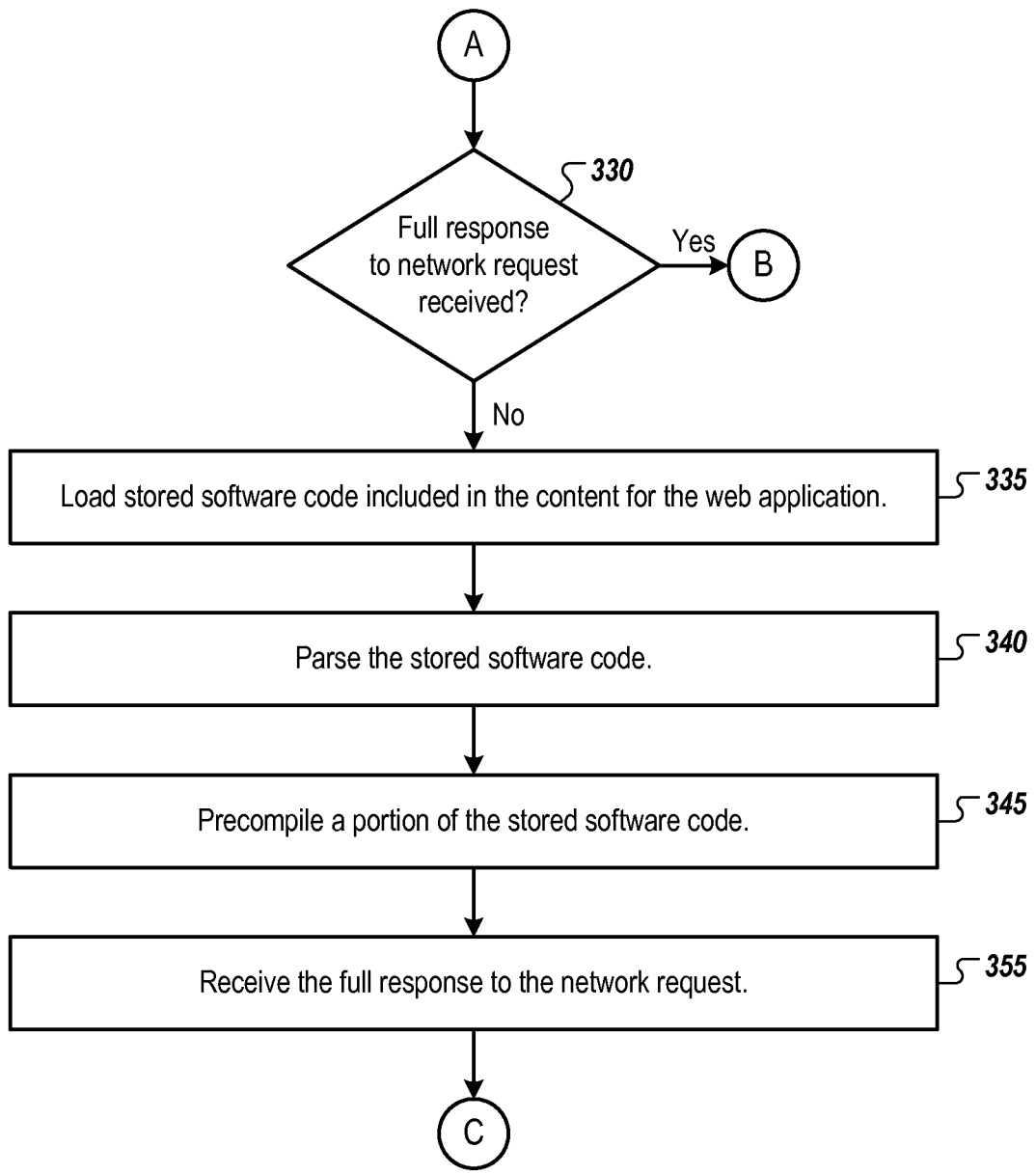
Figure 3C:
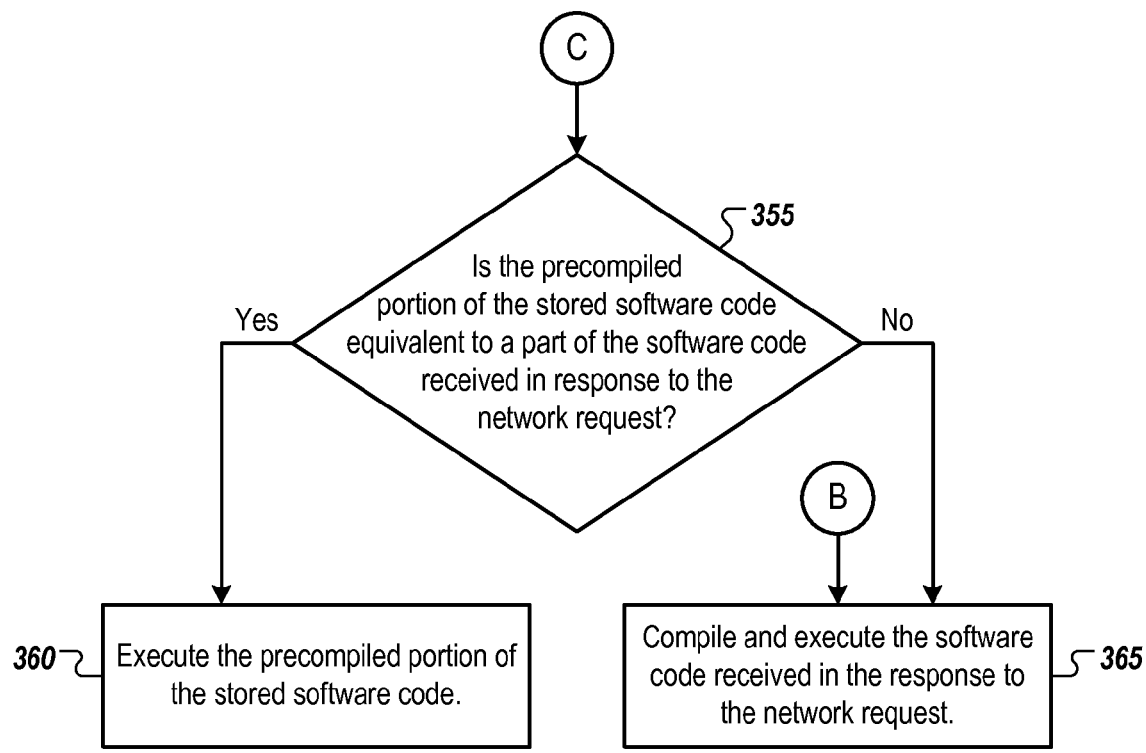

FIGS. 3A-3C illustrates an example process 300 by which locally-stored instructions for a web application may be precompiled.

As shown in FIG. 3A, the process 300 begins at step 305, where a client computing device (e.g., client computing device 110, via operation of the client application software code 216) receives a user input for requesting a web application. For example, if the client computing device is running a web browser, the user input can be an input of a URL or a selection of a hyperlink corresponding to a URL.

In step 310, the client computing device provides, via a network, a network request (e.g., HTTP request 130) for the web application. The network request is transmitted to a server.

In step 315, the client computing device determines that content for the web application (e.g., web application content 214) is stored in local storage (e.g., local storage 206) of the client computing device. For example, the client computing device determines that the content for the web application is stored in a disk at the client computing device.

In step 320, the client computing device determines whether a full response to the network request (i.e., all of the requested data for the web application) was received, for example, whether a current version of the web application (e.g., current version of web application 140) was received in response to the network request. If the response to the network request was received, the process 300 continues to step 365 of FIG. 3C. Otherwise, the process 300 continues to step 325.

In step 325, if the response to the network request was not received yet, the client computing places the content for the web application into the RAM (e.g., RAM 210) of the client computing device for faster processing of the content for the web application. According to some aspects, one or more of the steps 315 and 325 are performed prior to receiving the response to the network request for the web application or prior to processing the received response to the network request for the web application.

As shown in FIG. 3B, in step 330, the client computing device determines whether a full response to the network request (i.e., all of the requested data for the web application) was received, as in step 320. If the response to the network request was received, the process 300 continues to step 365 of FIG. 3C. Otherwise, the process 300 continues to step 335.

In step 335, the client computing device loads stored software code included in the content for the web application. In some aspects, depending on the operating system of the client computing device, loading the software code can include one or more of the following: obtaining validation (e.g., permissions, memory requirements, etc.) to execute the software code, copying one or more command line arguments on the stack of the operating system, initializing registers (e.g., the stack pointer) for execution of the software code, jumping to the program entry point (e.g., the start point), or other step(s) associated with loading software code in the operating system. The stored software code can be code in any programming language. In some aspects, the stored software code is scripting language (e.g., JavaScript) code. The stored software code can be loaded while waiting for the response to the network request for the web application, prior to receiving the response.

In step 340, the client computing device parses the stored software code.

In step 345, the client computing device precompiles a portion of the stored software code prior to receiving a response to the network request, for example, while waiting for the response to the network request. The portion of the stored software code can include all of the stored software code or a subset of the stored software code. According to some aspects, the stored software code includes a set of functions, and the portion of the stored software includes a subset of the set of functions. The functions in the subset are determined based on an optimization for minimizing a total of a compiling time and an execution time for the web application, minimizing an execution time for the web application, or minimizing a compilation overhead for the web application. In some aspects, the compiler only optimizes a subset of code because optimizing the code takes time. The optimized subset of code can include only those function(s) which are expected to execute based on previous program behavior. In some aspects, the optimization operates mostly (though, in some examples, not exclusively) by minimizing the number of instructions which will be executed in the compiled code. The compiler estimates what the path through the code will be based on previous program behavior and/or heuristics. The compiler generates instructions that are estimated to result in a fastest execution along the estimated path. In some examples, the client computing device also runs the compiled portion of the stored software code.

In some aspects, the client computing device loads, parses, and precompiles the stored software code, as described above in conjunction with steps 335, 340, and 345. However, in some implementations, the stored software code is not precompiled, parsed, or loaded, and one or more of steps 335, 340, or 345 may be skipped.

In step 350, the client computing device receives the full response to the network request. For example, the client computing device receives the full current version of the web application via the network. According to some aspects, in step 350, the client computing device waits until the full response to the network request is received.

As shown in FIG. 3C, in step 355, the client computing device determines whether the precompiled portion of the stored software code is equivalent to a part of the software code received in response to the network request. According to some aspects, the precompiled portion of the stored software code is equivalent to a part of the software code received in response to the network request if the precompiled portion of the software code either includes the same code as the part of the software code received in response to the network request or the precompiled portion of the software code has the same functionality as the part of the software code received in response to the network request. The part of the software code received in response to the network request can include all of the code received in response to the network request or a subset of the code received in response to the network request. If the precompiled portion of the stored software code is equivalent to the part of the software code received in response to the network request, the process 300 continues to step 360. Otherwise, the process 300 continues to step 365.

In step 360, if the precompiled portion of the stored software code is equivalent to the part of the software code received in response to the network request, the client computing device executes the precompiled portion of the stored software code. After step 360, the process 300 ends.

In step 365, the client computing device compiles and executes the software code received in the response to the network request. In some aspects, the client computing device foregoes execution of the precompiled portion of the stored software code. After step 365, the process 300 ends.

As shown in FIGS. 3A-3C and described above the steps 305-365 of the process 300 are implemented in a specified order and in series. However, the steps 305-365 may be implemented in any order. In some aspects, two or more of the steps 305-365 are implemented in parallel.

Figure 4:
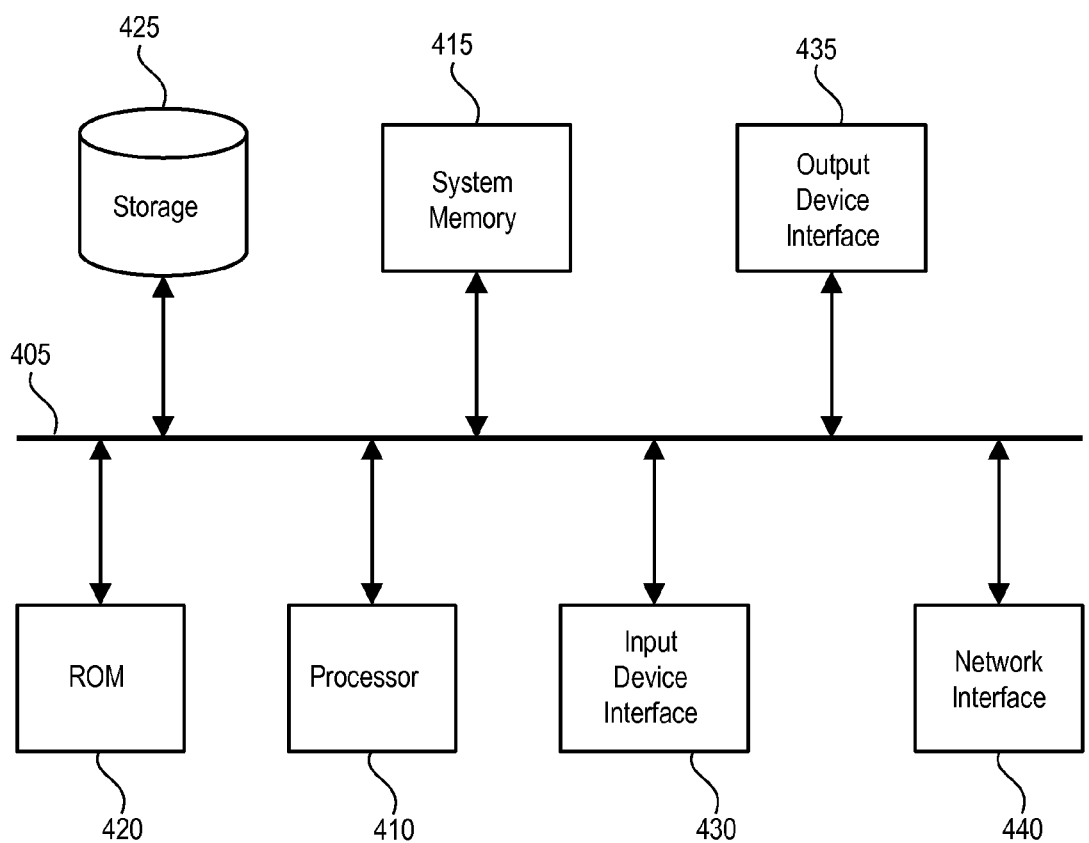
FIG. 4 conceptually illustrates an example electronic system with which some implementations of the subject technology are implemented.

FIG. 4 conceptually illustrates an electronic system 400 with which some implementations of the subject technology are implemented. For example, one or more of the server 120 or the client computing device 110 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for precompiling locally-stored instructions for a web application in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A system for accessing locally stored content for a web application, the system comprising:
   one or more processors; and
   local storage, residing on a random access memory (RAM) and a disk, the local storage comprising:
   precompilable software code for a web application stored on the disk; and
   a client application software code area, the client application software code area storing instructions which, when executed by the one or more processors, cause the one or more processors to implement a method, the method comprising:
   receiving a user input for requesting a web application;
   providing, via a network, a network request for the web application;
   placing the stored software code for the web application from the disk into the random access memory (RAM);
   precompiling at least a portion of the stored software code prior to receiving a response to the network request;
   receiving the response to the network request for the web application;
   determining, upon receiving the response to the network request for the web application, whether the stored software code is equivalent to at least a part of the software code received in the response to the network request;
   if the stored software code is equivalent to the at least the part of the software code received in the response to the network request, then executing the precompiled portion of the stored software code; and
   if the stored software code is not equivalent to the at least the part of the software code received in the response to the network request, then compiling and executing the software code received in the response to the network request while forgoing execution of the precompiled portion of the stored software code.

2. The system of claim 1, wherein the at least the portion of the stored software code comprises a subset of a set of functions in the stored software code, the method further comprising:

determining functions for the subset from the set of functions based on an optimization for minimizing a total of a compiling time and an execution time for the web application.

3. The system of claim 2, wherein the optimization for minimizing the total of the compiling time and the execution time for the web application comprises minimizing a number of instructions executed in the at least tile portion of the stored software code.

4. The system of claim 1, wherein the random access memory (RAM) comprises at least a portion of the client application software code area.

5. The system of claim 1, wherein the disk comprises at least a portion of the client application software code area.

6. The system of claim 1, wherein at least one of the determining and placing is performed prior to processing the received response to the network request for the web application.

7. The system of claim 1, wherein determining that the software code for the web application is stored in the local storage of the computer comprises:
determining that the software code for the web application is stored in a disk at the computer, wherein the disk is separate and distinct from the random access memory (RAM).

8. A computer-implemented method for accessing locally stored content for a web application, the method comprising:
receiving, at a client computing device, a user input for requesting a web application;
providing, via a network, a network request for the web application;
determining that precompilable software code for the web application is stored in local storage of the client computing device;
placing the stored software code for the web application into a random access memory (RAM) of the client computing device;
precompiling, at the client computing device, at least a portion of the stored software code prior to receiving a response to the network request;
receiving the response to the network request for the web application;
determining, upon receiving the response to the network request for the web application, whether the stored software code is equivalent to at least a part of the software code received in the response to the network request;
if the stored software code is equivalent to the at least the part of the software code received in the response to the network request, then executing the precompiled portion of the stored software code; and
if the stored software code is not equivalent to the at least the part of the software code received in the response to the network request, then compiling and executing the software code received in the response to the network request while forgoing execution of the precompiled portion of the stored software code.

9. The method of claim 8, wherein the at least the portion of the stored software code comprises a subset of a set of functions in the stored software code, the method further comprising:
determining functions the subset from the set of functions based on an optimization for minimizing a total of a compiling time and an execution time for the web application.

10. The method of claim 9, wherein the optimization for minimizing the total of the compiling time and the execution time for the web application comprises minimizing a number of instructions executed in the at least the portion of the stored software code.

11. The method of claim 8, wherein at least one of the determining that precompilable software code for the web application is stored in local storage of the client computing device and placing is performed prior to processing the received response to the network request for the web application.

12. The method of claim 8, wherein determining that the software code for the web application is stored in the local storage of the client computing device comprises:
determining that the software code for the web application is stored in a disk at the client computing device, wherein the disk is separate and distinct from the random access memory (RAM).

13. A non-transitory computer-readable medium for accessing locally stored content for a web application, the computer-readable medium comprising instructions which, when executed by a computer, cause the computer to implement a method, the method comprising:
receiving, at the computer, a user input for requesting a web application;
providing, via a network, a network request for the web application;
determining that precompilable software code for the web application is stored in local storage of the computer;
placing the stored software code for the web application into a random access memory (RAM) of the computer;
precompiling, at the computer, at least a portion of the stored software code prior to receiving a response to the network request;
receiving the response to the network request for the web application;
determining, upon receiving the response to the network request for the web application, whether the stored software code is equivalent to at least a part of the software code received in the response to the network request;
if the stored software code is equivalent to the at least the part of the software code received in the response to the network request, then executing the precompiled portion of the stored software code; and
if the stored software code is not equivalent to the at least the part of the software code received in the response to the network request, then compiling and executing the software code received in the response to the network request while forgoing execution of the precompiled portion of the stored software code.

14. The computer-readable medium of claim 13, wherein the at least the portion of the stored software code comprises a subset of a set of functions in the stored software code, the method further comprising:
determining functions for the subset from the set of functions based on an optimization for minimizing a total of a compiling time and an execution time for the web application.

15. The computer readable medium of claim 14, wherein the optimization for minimizing the total of the compiling time and the execution time for the web application comprises minimizing a number of instructions executed in the at least the portion of the stored software code.

16. The computer-readable medium of claim 13, wherein at least one of the determining that precompilable software code for the web application is stored in local storage of the computer and placing is performed prior to processing the received response to the network request for the web application.

17. The computer-readable medium of claim 13, wherein determining that the software code for the web application is stored in the local storage of the computer comprises:
   determining that the software code for the web application is stored in a disk at the computer, wherein the disk is separate and distinct from the random access memory (RAM).

* * * * *